(12) United States Patent
Tippett

(10) Patent No.: US 6,676,797 B2
(45) Date of Patent: Jan. 13, 2004

(54) COMPOSITE EXPANSION JOINT MATERIAL

(75) Inventor: Stephen W. Tippett, Bedford, NH (US)

(73) Assignee: Textiles Coated Inc., Amherst, NH (US)

( * ) Notice: Subject to any disclaimer, the term of this patent is extended or adjusted under 35 U.S.C. 154(b) by 347 days.

(21) Appl. No.: 09/826,278

(22) Filed: Apr. 4, 2001

(65) Prior Publication Data

US 2001/0030023 A1 Oct. 18, 2001

Related U.S. Application Data

(60) Division of application No. 09/552,182, filed on Apr. 18, 2000, now abandoned, which is a continuation-in-part of application No. 09/396,621, filed on Sep. 15, 1999, now abandoned.

(51) Int. Cl.⁷ ............... C09J 5/02; C09J 5/06; B32B 31/12; B32B 31/20; B05D 3/12
(52) U.S. Cl. ............... 156/307.3; 156/307.7; 427/208.2
(58) Field of Search ............... 156/145, 146, 156/155, 182, 228, 307.3, 307.7, 308.2; 427/207.1, 208, 208.2, 208.6, 208.8

(56) References Cited

U.S. PATENT DOCUMENTS

| | | |
|---|---|---|
| 2,833,686 A | 5/1958 | Sandt |
| 3,086,071 A | 4/1963 | Preston |
| 3,547,765 A | 12/1970 | Snyder et al. |
| 3,616,177 A | 10/1971 | Gumerman |
| 3,695,967 A | 10/1972 | Ross |
| 3,899,622 A | 8/1975 | Geiger |
| 3,928,703 A | 12/1975 | Cook |
| 4,013,812 A | 3/1977 | Geiger |
| 4,104,095 A | 8/1978 | Shaw |
| 4,165,404 A | 8/1979 | Quehl |
| 4,399,183 A | 8/1983 | Withers |
| 4,452,848 A | 6/1984 | Geiger |
| 4,610,918 A | 9/1986 | Effenberger et al. |
| 4,654,235 A | 3/1987 | Effenberger et al. |
| 4,732,413 A | 3/1988 | Bachmann et al. |
| 4,770,927 A | 9/1988 | Effenberger et al. |
| 4,883,716 A | 11/1989 | Effenberger et al. |
| 4,886,699 A | 12/1989 | Carroll et al. |
| 4,943,473 A | 7/1990 | Sahatjian et al. |
| 5,230,937 A | 7/1993 | Effenberger et al. |
| 5,296,287 A | 3/1994 | Ribbans |
| 5,368,923 A | 11/1994 | Tippett |
| 5,466,531 A | * 11/1995 | Tippett et al. ............ 428/422 |
| 5,496,628 A | 3/1996 | Ribbans |

FOREIGN PATENT DOCUMENTS

| | | |
|---|---|---|
| WO | WO 90/08034 | 7/1990 |
| WO | WO 001/19610 | 3/2001 |

* cited by examiner

*Primary Examiner*—Richard Crispino
*Assistant Examiner*—Sing Po Chan
(74) *Attorney, Agent, or Firm*—Samuels, Gauthier & Steven

(57) ABSTRACT

A single membrane insulation material including a non-woven insulation mat, a fluoropolymer dispersion surface coated to one side of the mat and a fluoropolymer film component laminated to the thus coated side of the mat under conditions of elevated temperature and pressure. The coating has a depth of penetration which is less than the total thickness of said mat.

20 Claims, 2 Drawing Sheets

COMPOSITE EXPANSION JOINT MATERIAL

CROSS REFERENCES TO RELATED APPLICATIONS

This is a divisional application of U.S. Ser. No. 09/552,182 filed Apr. 18, 2000 now abandoned which is a continuation-in-part application of U.S. patent application No. Ser. 09/396,621 filed on Sep. 15, 1999 now abandoned.

BACKGROUND OF THE INVENTION

1. Field of the Invention

This invention relates, primarily, to composite expansion joint materials for high temperature service, i.e., conditions where gas temperatures exceed 600° F.

2. Description of the Prior Art

Early examples of high temperature composite expansion joint materials are described in U.S. Pat. Nos. 5,296,287 and 5,496,628 (Ribbans), the disclosures of which are herein incorporated by reference. Such materials typically comprise a non-fluoropolymer thermal barrier (woven fiberglass mat) laminated to a fluid barrier (fluoropolymer film) and/or a load bearing composite (fluoropolymer coated fiberglass fabric). Lamination is typically effected by melt bondable adhesives, e.g. PFA, FEP, MFA, etc.

Although the performance of such products was excellent, their widespread acceptance by the industry was somewhat hampered by their high costs, due in part part to the high cost of the woven fiberglass mats used as the thermal barrier components.

Equally efficient and far less expensive nonwoven "needled" fiberglass mats were available, but their use was discounted due to the then perceived difficulty of effectively coating such high porosity materials with melt bondable adhesives. The adhesives would simply "wick" into the needled mats, with insufficient adhesive remaining at the lamination interface to effect an adequate bond with the mating component.

This problem was eventually solved by the introduction of the so call "glue sheet", an adhesive coated carrier element of the type described in U.S. Pat. No. 5,368,923 (Tippett), the disclosure of which is herein incorporated by reference. The adhesive carrier sheet comprised a light weight scrim coated with the melt bondable adhesive, typically PFA. During lamination, the adhesive remained locally confined at the lamination interface, resulting in an effective bonding without adhesive loss through wicking into the porous needled mat. Although highly successful in this regard, the relatively high cost of the adhesive carrier sheet continued to be a drawback.

Accordingly, the objective of the present invention is to overcome the above described problems and associated drawbacks by providing an improved lower cost high temperature composite expansion joint material in which the needled fiberglass mat is bonded to a fluid barrier component and/or a load bearing component by a surface coating of a fluoropolymer based dispersion. The surface coating is selectively applied to a depth which is less than the overall mat thickness, thereby efficiently conserving adhesive material while avoiding excessive penetration and resulting unwanted stiffness.

A companion objective of the present invention is to improve the resulting bond while further restricting adhesive penetration by densifying the needled fiberglass mat as a preparatory step to lamination with the other components of the composite.

BRIEF SUMMARY OF THE INVENTION

A single membrane insulation material including a non-woven insulation mat, a fluoropolymer based dispersion surface coated onto one side of the mat and a fluoropolymer containing component laminated to the thus coated side of the mat under conditions of elevated temperature and pressure. The coating has a depth of penetration which is less than the total thickness of the mat.

These and other objects, features and advantages of the present invention will hereinafter be described in greater detail with reference to the accompanying drawings, wherein:

DETAILED DESCRIPTION OF THE INVENTION

Figure 2:
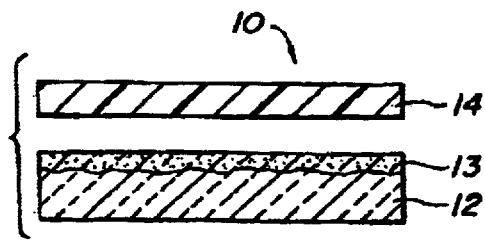
FIG. 2 is an exploded cross-sectional view of the components of a composite expansion joint material in accordance with the present invention.
Figure 3:
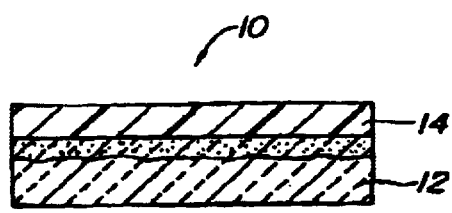
FIG. 3 a cross-sectional view showing the components of FIG. 2 following lamination under conditions of elevated temperature and pressure.
Figure 4:
FIG. 4 is a cross sectional view of another embodiment incorporating an additional load bearing component for added strength.

With reference initially to FIG. 2, the components of one embodiment of a composite high temperature expansion joint material of the present invention include a nonwoven fiberglass mat 12 coated as at 13 with a fluoropolymer dispersion, and a fluid barrier 14. FIG. 3 shows the same components after they have been laminated under conditions of elevated temperature and pressure. If the strength of the resulting laminate is inadequate for certain applications, as shown in FIG. 4, a load bearing component 16 can be added to the laminated composite.

Figure 1A:
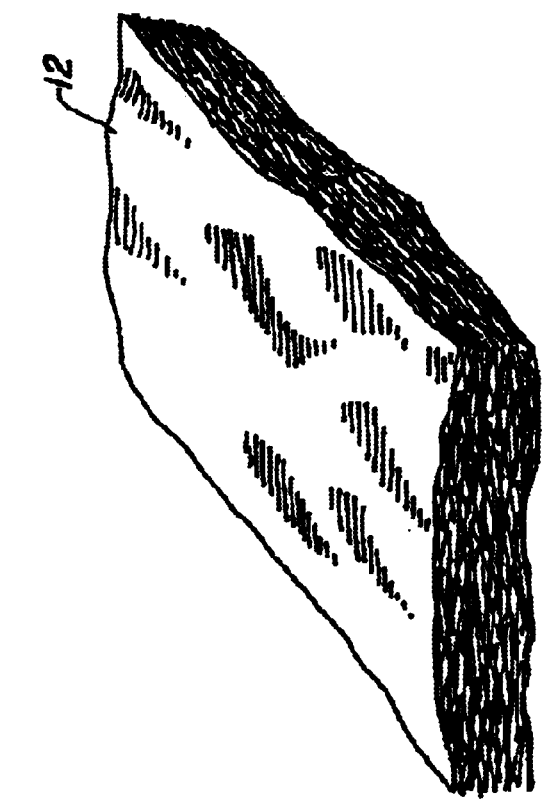
FIGS. 1A and 1B are plan views respectively of a virgin needled fiberglass mat and a needled fiberglass mat following its densification in accordance with the present invention.
Figure 1B:
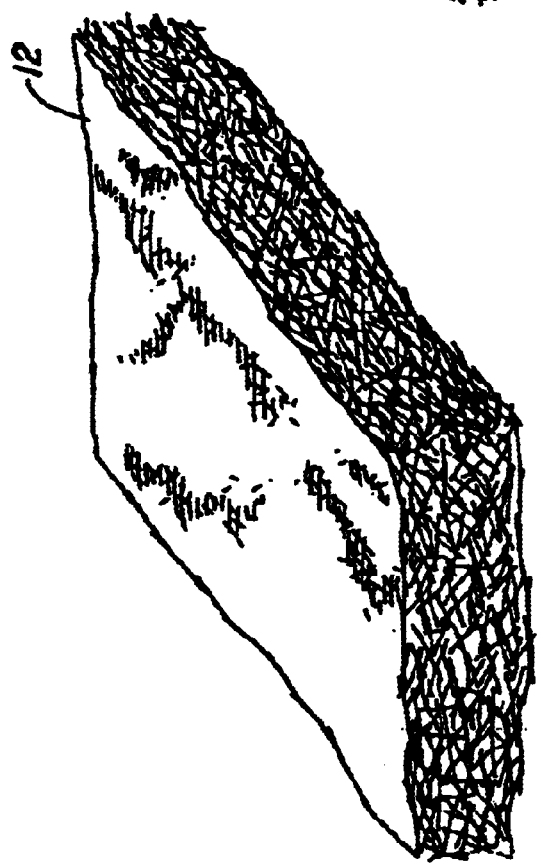

The needled fiberglass mat is advantageously densified to reduce its thickness by 5 to 50%. FIGS. 1A and 1B show the fiberglass mat 12 before and after densification, respectively. The densification process increases the uniformity of thickness of the mat and flattens the mat's surface. The surface of the densified mat is thus more susceptible to being evenly coated by the fluoropolymer dispersion, and its increased density serves to resist wicking of the dispersion into its interior.

The mat 12 is densified under conditions of elevated temperature and pressure by compressing it between heated platens. The mat 12 is densified at a temperature between 200 and 900° F. and preferably at a temperature of approximately 725° F. The operating pressures are between about 5 to 100 psi and preferably at approximately 40 psi. Cycle time is between 20 and 150 seconds and preferably approximately 75 seconds. The densification process "cleans" the fiberglass by burning off chemicals in the fiberglass. The resultant densified mat has a much greater internal strength than the virgin needled fiberglass mat.

The fluoropolymer dispersion may include of PTFE, FEP, PFA, MFA, as well as mixtures and blends thereof, and may further include fluoroelastomers, and perfluoroelastastomers. The preferred fluoropolymer dispersion is PTFE based and is thixotropic.

The PTFE coated fiberglass mat 12 is laminated to the fluid barrier 14 under conditions of elevated temperature and pressure. Temperatures range between 660 and 900° F., with the preferred temperature being approximately 725° F. Pressures range between 1 and 100 psi, with a pressure of approximately 40 psi being preferable. Lamination cycle time ranges between 5 and 240 seconds, and preferably is approximately 90 seconds. In the laminate, there is a mechanical bond between the coating and the mat and an intermolecular bond between the coating and the film.

The application of the fluoropolymer dispersion should be carefully controlled and localized at the surface of the mat, with penetration being adequate to achieve the desired bond, yet limited to a depth which does not unduly increase mat stiffness. Penetration depths should range between 0.001 and 0.125 inches, with the preferred depth being between 0.002 and 0.50 inches. In any event, penetration depth should not exceed 50% of the overall mat thickness.

The depth of penetration of the fluoropolymer dispersion is dependent on a number of factors, including the density of the mat 12, the viscosity of the dispersion, the specific gravity of the dispersion, the coating method and its corresponding parameters such as coating time, etc.

A fluoropolymer dispersion will be chosen based on the characteristics required to produced the desired product. The specific dispersion selected must have sufficient penetration to create an adequate bond between the fiberglass mat and its associated component. Dispersions having a wide range of viscosities can be utilized dependent on the thickness and porosity of the mat, the desired weight of the finished product, the stiffness of the finished product, etc.

As disclosed, the specific gravity of the dispersion also affects the coating properties. The specific gravity of the dispersion should be in the range of between 1.05 and 1.5 and preferably at least 1.35. Coating weights should be at least 0.5 oz/sq yd and less than 32 oz/sq yd. More preferably the coating weight is preferably between 0.5 and 10 oz/sq yd, with the optimal weight being approximately 5.0 oz/sq yd.

Fluoropolymers useful in the composite expansion joint material of the present invention may be selected from those known to those skilled in the art, as described for example in U.S. Pat. No. 4,770,927 (Effenberger et al.), the disclosure of which is herein incorporated by reference in its entirely. Commercially available fluoropolymer products useful with the present invention include the following:

Perfluoroplastics

| | |
|---|---|
| PTFE - | Daikin-Polyflon; Dupont Teflon; ICI Fluon; Ausimont Algoflon |
| FEP - | Daikin Neoflon; Dupont Teflon |
| PFA - | Daikin Neoflon; Dupont Teflon; Ausimont Hyflon |
| MFA - | Ausimont Hyflon |

Fluoroelastomers
  Dupont Viton
  3M Fluorel
  Ausimont Tecnoflon
  Daikin Daiel
  Asahi Glass Aflas
Perfluoroelastomers
  Dupont Kalrez
  Daikin Perfluor Of the above, PTFE and specifically unsintered PTFE is preferred. PTFE produces a good mechanical bond with the surface of the fiberglass mat and an intermolecular bond with the fluoropolymer content of the associated fluid barrier or load bearing component. Also it is less expensive than many of the other fluoropolymer dispersions.

The fluoropolymers of the present invention may additionally include fillers, pigments and other additives, examples of which include titanium dioxide, talc, graphite, carbon black, cadmium pigments, glass, metal powders and flakes, and other high temperature materials such as sand, fly ash, etc.

Figure 5:
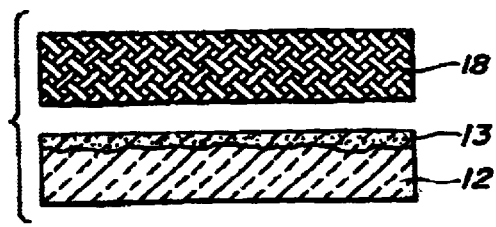
FIG. 5 is an exploded cross-sectional view of the components of still another embodiment of the invention.

The fluid barrier component 14 comprise films of PTFE, FEP, PFA or MFA. As shown in FIG. 5, the coated fiberglass mat 12 may alternatively be laminated to a load bearing component 18 such as TEXCOAT™ or to a combination of a fluid barrier component 14 and a load bearing component 16 as shown in FIG. 4. The load bearing component may include fabric substrates, including woven or knitted substrates, produced from various materials including inter alia, fiberglass, amorphous silica, graphite, polyaramides including Kevlar and Nomex, PBI (polybenzimadazole), ceramics and metal wires, and combinations thereof. Fiberglass is the preferred substrate material.

To produce high temperature insulation materials, i.e. those used at temperatures over 600° F., the insulation mat fibers should be formed from nonfluoropolymers and consist of randomly arranged mechanically interlocked fibers. The nonfluoropolymers may include fiberglass, amorphous silica, graphite, polyaramides, polybenzimadazole and ceramics.

The fiberglass mat may be coated by various techniques employing vertical coating towers, spray coaters, reverse roll coaters, roller coaters, horizontal coaters with doctor blades, etc.

Alternatively, two lamination steps may be employed in the production of the composite expansion joint material illustrated in FIG. 4. Initially, the insulation mat 12 is densified as previously discussed, and then coated with an unsintered PTFE dispersion 13.

A fluid barrier component 14, typically an unsintered PTFE film 14, and a load bearing component 16 are laminated under appropriate elevated temperature and pressure conditions with the lamination cycle time ranging between 5 and 240 seconds and preferably being approximately 60 seconds.

Subsequently, the fluid barrier surface of the laminated component is laminated to the coated surface of the densified mat, with lamination cycle time ranging between 5 and 325 seconds, and preferably being approximately 240 seconds.

This two step lamination procedure improves the overall quality of the insulation product by ensuring that a sufficient bond is obtained between the fluid barrier component 14 and the load bearing component 16 before completing the final lamination step of the process.

The following are illustrative examples of composite expansion joint materials in accordance with the present invention.

EXAMPLE A

A needled fiberglass insulation mat having a thickness of ½" and a density of 9–11 lbs/cu ft (BGF Mat; BGF Industries, Inc.; Greensboro, N.C.) was densified between platens heated to 725° F. Densification was carried out at a pressure of 40 psi for 75 seconds. The resulting densified mat, having a thickness of ⅜" and a density of 13 lbs/cu ft was surface coated on one side with a PTFE dispersion (Algoflon D60G; Ausimont USA; Thorofare, N.J.) having a specific gravity of 1.35 and a viscosity of 250,000 cp. Coating weight was 4.89 oz/sq yd with the penetration below the coated surface averaging about 0.005". An unsintered PTFE film having a thickness of 0.004" (DeWal Corporation; Saunderstown, R.I.) was then laminated to the coated surface of the insulation mat. Lamination was effected between heated platens at a temperature of 725° F. and a pressure of 40 psi for a cycle time of 90 seconds.

The resulting bond between the PTFE film and the coated insulation mat was very uniform, essentially free of any significant lamination voids across the surface of the lamination specimen. The adhesion bond between the film and needled mat was high, exceeding the internal strength of the insulation mat. The insulation mat tore in every attempt to separate the insulation component from the bonded PTFE film.

EXAMPLE B

TEXCOAT™ 1400 (Available from Textiles Coated, Inc.; 32 oz/sq yd fiberglass fabric, Hexcel-Schwebel Corporation, Anderson, S.C.; coated with Algoflon D60G PTFE dispersion to 48 oz/sq yd) was laminated to the coated surface of the insulation mat of Example A with a 0.004" PTFE film (DeWal Corporation) placed in between. The components were laminated at a temperature of 725° F. and pressure of 40 psi for a cycle time of 135 seconds.

The resulting bond between the three components was very uniform, essentially free of any significant lamination voids across the surface of the lamination specimen. The adhesion bond of the laminate exceeded the internal strength of the insulation mat. The insulation mat tore in every attempt to delaminate any of the three components in the laminate.

EXAMPLE C

TEXCOAT™ 300 (Available from Textiles Coated, Inc.; 8.5 oz/sq yd fiberglass fabric, JPS Industries, Inc., Slater, N.C.; coated with Algoflon D60G PTFE dispersion to 18 oz sq yd) was laminated to the coated surface of the insulation mat of Example A. The components were laminated at a temperature of 725° F. and pressure of 40 psi for a cycle time of 135 seconds.

The resulting bond between the two components was very uniform, essentially free of any significant lamination voids across the surface of the lamination specimen. The adhesion bond of the laminate exceeded the internal strength of the insulation mat. The insulation mat tore in every attempt to separate the TEXCOAT™ 300 component from the bonded mat. The foregoing description has been limited to a specific embodiment of the invention. It will be apparent, however, that variations and modifications can be made to the invention, with the attainment of some or all of the advantages. For example the insulation material may be used in conjunction with additional components dependent on the desired final product. Also, the insulation material may be used in applications below 600° F., e.g., to reduce heat loss from flue gas to the environment. It is the object of the claims to cover all such variations and modifications as come within the true spirit and scope of the invention.

EXAMPLE D

A needled fiberglass insulation mat having a thickness of ½" and a density of 9–11 lbs/cu ft (BGF Mat; BGF Industries, Inc.; Greensboro, N.C.) was densified between platens heated to 725° F. Densification was carried out at a pressure of 40 psi for 75 seconds. The resulting densified mat, having a thickness of ⅜" and a density of 13 lbs/cu ft was surface coated on one side with an unsintered PTFE dispersion (Algoflon D60G; Ausimont USA; Thorofare, N.J.) having a specific gravity of 1.35 and a viscosity of 250,000 cp. The coating weight was 4.89 oz/sq yd with the penetration below the coated surface averaging about 0.005".

An unsintered PTFE film having a thickness of 0.004" (DeWal Corporation; Saunderstown, R.I.) was then laminated to TEXCOAT™ 1400. The components were laminated between heated platens at a temperature of 725° F. and a pressure of 40 psi for a cycle time of 60 seconds to produce a laminated composite.

The coated surface of the insulation mat was then laminated to the film surface of the laminated composite. This second lamination step was performed at a temperature of 725° F. and a pressure of 40 psi for a cycle time of 240 seconds.

The resulting bond between the PTFE film and the coated insulation mat was very uniform, essentially free of any significant lamination voids across the surface of the lamination specimen. The adhesion bond between the film and needled mat was high, exceeding the internal strength of the insulation mat. The insulation mat tore in every attempt to separate the insulation component from the bonded PTFE film.

EXAMPLE E

TEXCOAT™ 300 was laminated to the unsintered PTFE coated surface of the insulation mat of Example D. The components were laminated at a temperature of 725° F. and a pressure of 40 psi for a cycle time of 240 seconds.

The resulting bond between the two components and was very uniform, essentially free of any significant lamination voids across the surface of the lamination specimen. The adhesion bond of the laminate was high, exceeding the internal strength of the insulation mat. The insulation mat tore in every attempt to separate the TEXCOAT™ 300 from the bonded mat.

I claim:

1. A method of preparing a single membrane high temperature insulation material, said method comprising:
    densifying a nonwoven insulation by reducing its thickness by about 5–50%;
    coating a surface of said densified mat with a fluoropolymer based dispersion, said coating having a depth of penetration which is less than the total reduced thickness of said densified mat; and
    laminating said coated and densified mat to a fluoropolymer containing component under conditions of elevated temperature and pressure.

2. The method of claim 1, wherein said insulation material is laminated for a time period between 5 and 240 seconds.

3. The method of claim 2, wherein said insulation material is laminated for a time period of approximately 90 seconds.

4. A method of preparing a single membrane high temperature insulation material, said method comprising:
    coating a surface of a nonwoven insulation mat with an unsintered polytetrafluoroethylene based dispersion, said coating having a depth of penetration which is less than the total thickness of said mat;
    laminating in a first step an unsintered polytetrafluoroethylene film to one side of a load bearing component under conditions of elevated temperature and pressure; and laminating in second step said coated surface of said insulation mat to the polytetrafluoroethylene film surface of the laminated component under conditions of elevated temperature and pressure, resulting in said coating and said film being sintered.

5. The method of 4, further comprising densifying said nonwoven insulation material.

6. The method of claims 1 or 5, wherein the densification of said mat includes placing said mat between two platens under conditions of elevated temperature and pressure.

7. The method of claim 5 wherein said densification reduces the thickness of said insulation mat by 5 to 50%.

8. The method of claims 1 or 5, wherein said insulation mat is densified at a temperature of between 200 and 900° F.

9. The method of claim 8, wherein said insulation mat is densified at a temperature of approximately 725° F.

10. The method of claims 1 or 5, wherein said insulation mat is densified at a pressure of between 5 and 100 psi.

11. The method of claim 10, wherein said insulation mat is densified at a pressure of approximately 40 psi.

12. The method of claims 1 or 5, wherein said insulation mat is densified for a time period between 20 and 150 seconds.

13. The method of claim 12, wherein said insulation mat is densified for a time period of approximately 75 seconds.

14. The method of claims 1 or 4, wherein said insulation material is laminated at a temperature of between 660 and 900° F.

15. The method of claim 14, wherein said insulation material is laminated at a temperature of approximately 725° F.

16. The method of claims 1 or 4, wherein said insulation material is laminated at a pressure of between 1 and 100 psi.

17. The method of claim 16, wherein said insulation material is laminated at a pressure of approximately 40 psi.

18. The method of claim 4, which comprises effecting said first and second laminations for a time period between 5 and 325 seconds.

19. The method of claim 18, which comprises effecting said first lamination for a time period of approximately 60 seconds.

20. The method of claim 18, which comprises effecting said second lamination for a time period of approximately 240 seconds.

* * * * *

UNITED STATES PATENT AND TRADEMARK OFFICE
CERTIFICATE OF CORRECTION

PATENT NO. : 6,676,797 B2
DATED : January 13, 2004
INVENTOR(S) : Stephen W. Tippett It is certified that error appears in the above-identified patent and that said Letters Patent is hereby corrected as shown below:

Column 6,
Line 45, please insert -- mat -- after "densifying a nonwoven insulation".
Lines 54 and 56, please delete "material" and insert -- mat -- after "wherein said insulation".

Column 7,
Line 6, please insert -- claim -- after "The method of".
Line 7, please delete "material" and insert -- mat -- after "nonwoven insulation".

Column 8,
Lines 4, 7, 10 and 12, please delete "material" and insert -- mat -- after "wherein said insulation".

Signed and Sealed this

Sixteenth Day of August, 2005

JON W. DUDAS
*Director of the United States Patent and Trademark Office*